Dec. 30, 1969   F. D. SOLOMON   3,486,182
MECHANISM FOR SUPPORTING AND POSITIONING
WRAPAROUND BRUSHES IN A CAR WASH
Filed Feb. 27, 1968   4 Sheets-Sheet 1

INVENTOR.
FRED D. SOLOMON
BY Hamilton, Cook,
Renner & Kenner
ATTORNEYS

INVENTOR.
FRED D. SOLOMON

INVENTOR.
FRED D. SOLOMON
BY Hamilton, Cook,
Renner & Kenner
ATTORNEYS

United States Patent Office 3,486,182
Patented Dec. 30, 1969

3,486,182
MECHANISM FOR SUPPORTING AND POSITIONING WRAPAROUND BRUSHES IN A CAR WASH
Fred D. Solomon, Akron, Ohio, assignor to Lanning Equipment Corp., Akron, Ohio, a corporation of Ohio
Filed Feb. 27, 1968, Ser. No. 708,600
Int. Cl. B60s 3/06
U.S. Cl. 15—21    9 Claims

ABSTRACT OF THE DISCLOSURE

A mechanism for supporting and positioning wraparound brushes used an automatic car washes. A support member has two brushes rotatably mounted thereon in spaced relation, and the support member is swingingly mounted on a positioning gate to translate the two brushes arcuately about a common pivot. The positioning gate is also swingingly mounted about a pivot on a frame in turn to swing the pivot point about which the support member independently swings. A first actuating means is secured between the support member and the positioning gate. This first actuating means swings the support member with respect to the positioning gate in response to the rotational resistance met by one of the brushes mounted on the support member. A second actuating means is similarly secured between the frame and the positioning gate to swing the gate with respect to the frame in response to the rotational resistance met by the second of the two brushes mounted on the support member.

BACKGROUND OF THE INVENTION

Automatic car washing systems are generally of two types. In one type the automobile is parked in a stationary position, and the washing mechanism traverses the extent of the vehicle, often making several passes to complete the job. In a second type system the washing mechanism is fixed and the automobile is propelled therethrough at a predetermined speed, the speed and spacing of successive automobiles through the washing mechanism being controlled by the utilization of some type conveyor mechanism. The present invention relates to a mechanism primarily utilized for supporting and positioning the brushes used to wash the front, sides and rear of a vehicle below the window level. Although this mechanism shall only be described in conjunction with the second type system, the present concept can also be readily adapted by those skilled in the art to the first type system.

To clean the front, sides and rear of a vehicle, and particularly that area beneath the windows, most prior art automatic car washing systems of the second type employ wraparound brushes. Most prior known arrangements employ two wraparound brush units, on unit for each side of the car. A typical wraparound brush unit employs a pair of vertically disposed brushes. These wraparound brushes are longitudinally spaced, each brush being carried on an individual support frame. The support frames in each unit are oppositely disposed and movable through horizontal arcs.

The brush carried on one support frame washes a portion of the front and one side of the auto, and the brush on the second frame in such a unit also washes a portion of that side and a portion of the rear of the auto. That frame which supports the brush for washing the front of the vehicle swings along an arcuate quadrant in the same general direction as the vehicle is being propelled through the washing mechanism so that as the auto moves forwardly the brush will have a component of forward motion to accommodate the forward movement of the vehicle and at the same time a component of lateral movement to wash laterally across the front of the vehicle.

That frame which supports the brush for washing the rear of the vehicle, being mounted in opposition to the support frame for the front brush, similarly provides components of forward and lateral movement to accomplish a washing of the rear of the vehicle as it traverses through the washing mechanism.

Until quite recently, prior known arrangements of this type predisposed the brush that washes the front of the vehicle, by the biasing action of an air cylinder, into the path along which the vehicle was to be moved. This brush, which was generally rotatably powered by a fluid motor, was rotated in such a direction that it "walked" across the front surface of the car, the air cylinder providing a modest biasing action to hold the brush in contact therewith. As the vehicle moved forwardly against this front brush, the supporting frame on which it was carried swung sufficiently laterally, by contact of the car against the brush, that the brush carried thereon contacted the side of the car. As the front brush reached approximately this position the support frame on which it was carried actuated an air switch to pressurize a control cylinder that biasingly urged the second support frame of the wraparound unit arcuately outwardly toward the car. The brush carried on the second frame also engaged the side of the car and as the car moved therepast this rotationally, self-propelled brush walked along the side and rear contour of the vehicle.

It has been found that the afore-described wraparound brush system has many deficiencies. One of the most onerous of these deficiencies is the requirement for complex switching and valving arrangements to insure the proper sequential positioning of the independent supports for the two brushes in each wraparound unit.

In operation, one or more of the switches and valves may easily malfunction. At best, this resulted in failure of the particular brush controlled thereby to make contact with, and properly clean, its assigned portion of the vehicle. At worst, the front of the vehicle contacted that brush designated to wash the rear thereof. Because the "rear" brushes are not mounted to swing forwardly and away from the path of the vehicle, such contact results in serious damage to either the washing mechanism or the vehicle, or both.

SUMMARY OF THE INVENTION

It is therefore the primary object of the present invention to provide a mechanism for supporting and positioning both brushes in a wraparound unit completely to clean the designated portion of the vehicle being washed without the necessity of using any switches or valves.

It is another object of the present invention to provide a supporting and positioning mechanism, as above, whereby contact of the front of the vehicle being washed with the brush normally designated to wash the rear portion of the vehicle will not damage either the washing mechanism or the vehicle.

It is a further object of the present invention to provide a supporting and positioning mechanism, as above, whereby the two brushes, after completing their washing assignment on one vehicle, will be normally returned to the position for accepting the next vehicle, again without the necessity for switches or valves.

It is a still further object of the present invention to provide a supporting and positioning mechanism, as above, which is equally adaptable to that variety of car wash wherein the washing mechanism moves with respect to the vehicle as that variety in which the vehicle moves with respect to the washing mechanism.

These and other objects of the invention, as well as the advantages thereof over existing prior art forms, will become apparent from the following detailed description of the attached drawings and are accomplished by means hereinafter described and claimed.

In general, a mechanism for supporting and positioning the brushes of a wraparound unit embodying the concept of the present invention has the two brushes rotatably mounted on a single support member. The support member is bifurcated with two time portions extending divergently outwardly from a pivotal connection by which the support member is attached to a positioning gate—the cleaning brushes being rotatably mounted, one on the outer extremity of each tine portion.

The positioning gate is itself pivotally attached to a frame. As such, the two brushes are movable arcuately about a common pivot as the support member is swung with respect to the positioning gate, and they are also movable arcuately about a second common pivot as the positioning gate is swung with respect to the frame.

Arcuate movement of the support member about its pivotal connection to the positioning gate is effected by a first actuating means connected between the support member and the positioning gate. This actuating means is responsive to the frictional resistance met by the first of the two brushes rotatably mounted on the support member.

Arcuate movement of the positioning gate about its pivotal connection to the frame is effected by a second actuating means connected between the positioning gate and the frame. This second actuating means is responsive to the frictional resistance met by the second of the two brushes rotatably mounted on the support member.

One preferred embodiment of the present invention is shown by way of example in the accompanying drawings and is described in detail without attempting to show all of the various forms and modifications in which the invention might be embodied; the invention being measured by the appended claims and not by the details of the specification.

DESCRIPTION OF THE PREFERRED EMBODIMENT

A typical embodiment of a mechanism utilizing the concept of the present invention for supporting and positioning the wraparound brushes in an automatic car wash is indicated generally by the numeral 10 on the attached drawings. Although two wraparound units are generally required to wash both sides of the vehicle, inasmuch as the two units can be identical only one unit has been depicted for explanation herein.

Figure 8:
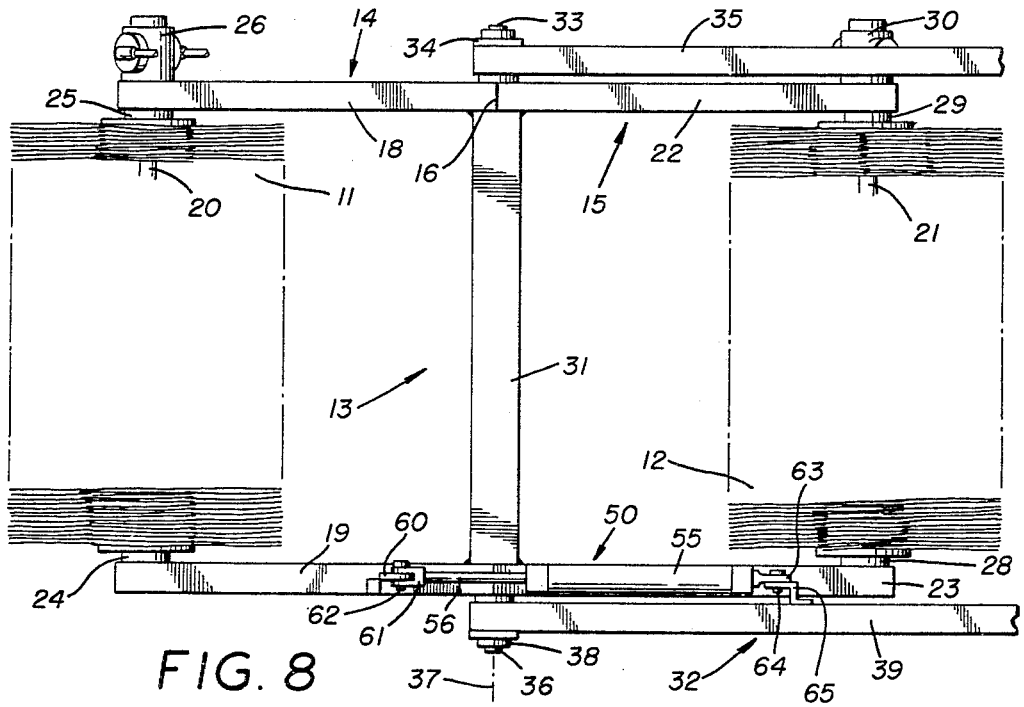
FIG. 8 is a partial side elevation taken substantially on line 8—8 of FIG. 6; and, FIG. 9 is a schematic representation of the piping system employed by the preferred embodiment including a representation of the cylinders used in conjunction with the preferred actuating means in longitudinal section.

Both brushes 11 and 12 are rotatably mounted on a single support member 13. Support member 13 is bifurcated with two tine portions 14 and 15 extending downwardly from an apex 16—this bifurcation permitting the support member to clear the corners of the vehicle being washed thereby. As best seen in FIG. 8, the tine portion 14 has vertically spaced, upper and lower beams 18 and 19, respectively, between which vertically oriented brush 11, carried on shaft 20, is rotatably mounted. Brush 12, carried on shaft 21, is similarly mounted for rotation between the upper and lower beams 22 and 23 of tine portion 15.

The lower end of shaft 20 is received in a blind journal 24 carried on beam 19, and the upper end of shaft 20 extends through a cylindrical journal 25 carried on beam 18 and is connected to a fluid motor 26. The lower end of shaft 21 is similarly received in a blind journal 28 carried on beam 23, and the upper end of shaft 21 extends through a cylindrical journal 29 carried on beam 22 and is connected to a fluid motor 30.

A spacer bar 31 is located at the apex 16 of the support member 13. Spacer bar 31 provides a base to which the upper and lower beams comprising the tine portions 14 and 15 can be rigidly secured. A stub shaft 33 extends upwardly from the apex 16 of support member 13 and is rotatably received in a journal 34 carried on the outer extremity of the upper, preferably horizontal, arm 35 of positioning gate 32. An oppositely directed stub shaft 36 extends downwardly from the apex 16 of support member 13 and is rotatably received in a journal 38 carried on the outer extremity of a lower, preferably horizontal, arm 39 of positioning gate 32. The stub shafts 33 and 36 thus define the pivotal axis 37 about which the support member 13 rotates with respect to the positioning gate 32. This rotation of support member 13 translates both brushes 11 and 12 arcuately about the pivotal axis 37.

A rear post 40 extends vertically between the ends of the arms 35 and 39 on gate 32 remote from the aforedescribed pivotal connections of the support member 13 to the positioning gate 32 and is itself pivotally connected to a frame 41 by hinge means 42. Although many varieties of hinge means could be utilized, the opposed stub shafts 43 and 44 (FIG. 7) received in journals 45 and 46 mounted on the vertically spaced upper and lower bars 48 and 49, respectively, of frame 41 adequately suffice.

A first actuating means 30 (FIGS. 6 and 8), connected between the support member 13 and positioning gate 32, effects arcuate movement of the support member 13 about its pivotal connection to the positioning gate 32 in response to the frictional resistance met by first brush 11.

The preferred actuating means is described in detail in my copending U.S. application, Ser. No. 703,694, filed Feb. 7, 1968, and will, therefore, be described herein only sufficiently to impart a complete understanding of the present concept.

The fluid motor 26, by which the first brush is rotated, is powered by a fluid pump 51 (FIG. 9) but may be located remotely therefrom. Fluid is conducted from the output side 51o of 51 to the input side 26i of motor 26 by an input conduit 52, and a return conduit 53 connects the exhaust side 26e of motor 26 to the input side 51i of pump 51. The pressure differential of the fluid across the motor 26 functions both as a position sensing means and a position control means for the rotation of the support member 13 with respect to gate 32.

Figure 6:
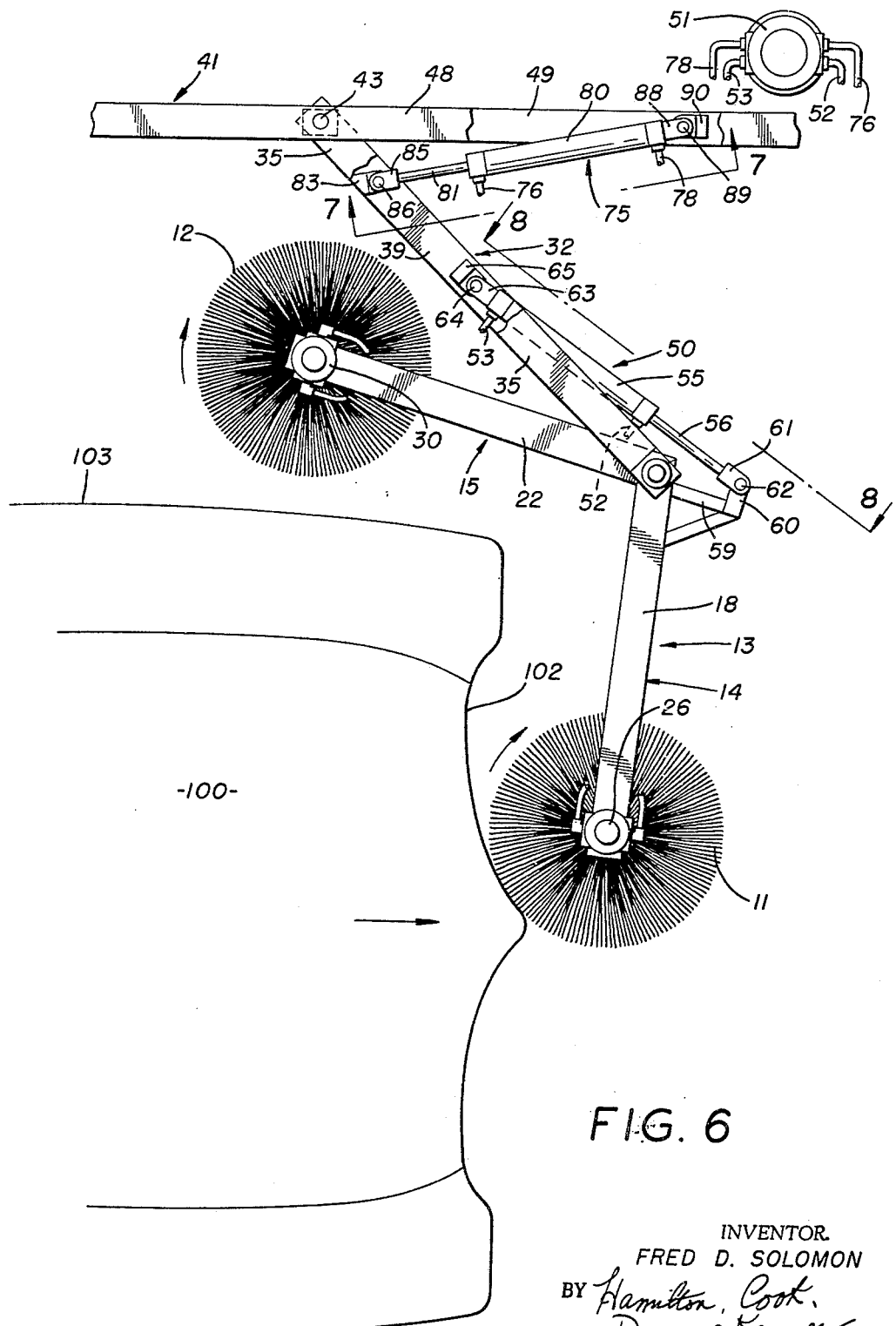
FIG. 6 is an enlarged top plan of the mechanism for supporting and positioning the brushes of a wraparound unit depicted in an interim position between those represented by FIGS. 1 and 2.

Specifically, a double acting control piston 54 (FIG. 9) is reciprocally slidable within an operating cylinder 55. A piston rod 56 is connected, at one end, to the piston 54 and extends outwardly through the end wall 58 of cylinder 55. The outer end of piston rod 56 is pivotally attached to the support member 13. As best seen in FIGS. 6 and 8, a braced extension bar 59 is fixed to the lower arm 19 of tine portion 14 and presents a connecting tab 60 embraced by a clevis 61 on the outermost end of piston 56. A pin 62 pivotally joins the clevis 61 to the connecting tab 60.

The cylinder 55 is pivotally mounted from the positioning gate 32. Specifically, a lug 63 on cylinder 55 is joined, by pin 64, to a Z-bar anchor 65 fixed to the lower arm 39 on positioning gate 32.

Figure 9:
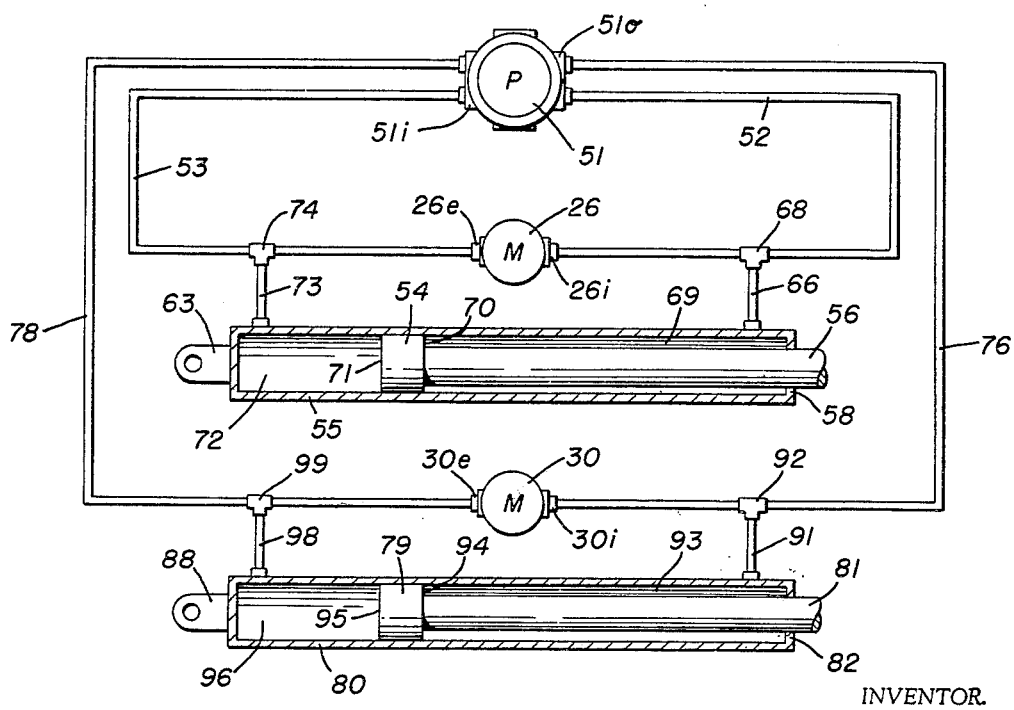

As shown in FIG. 9, a lateral conduit 66 taps into the input conduit 52, as by a T-connection 68, and communicates the pressure therein to the high pressure chamber 69 in cylinder 55—the high pressure chamber being the chamber exposed to that face 70 on piston 54 to which the rod 56 is attached.

The opposite face 71 of piston 54 is exposed to the low pressure chamber 72 in cylinder 55. Chamber 72 communicates with the low pressure side of motor 26 by a lateral conduit 73 that taps into the return conduit 53 by a T-connection 74.

A second actuating means 75 (FIGS. 6 and 7), connected between the positioning gate 32 and frame 41, effects arcuate movement of the support member 13 about the pivotal connection of the positioning gate 32 to the frame 41 in response to the frictional resistance met by the second brush 12. This arcuate movement translates the brushes 11 and 12 on secondary arcs about the pivotal connection defined by hinge means 42.

The fluid motor 30, by which the second brush 12 is rotated, may be powered by a common, or separate, fluid pump 51. Pressurized fluid from pump 51 is conducted from the output side 51o of pump 51 to the input side 30i of motor 30 by an input conduit 76, and a return conduit 78 connects the exhaust side 30e from motor 30 to the input side 51i of pump 51. The pressure differential of the fluid across motor 30 functions both as a position sensing means and a position control means for rotation of the positioning gate 32 with respect to the frame 41.

Figure 7:
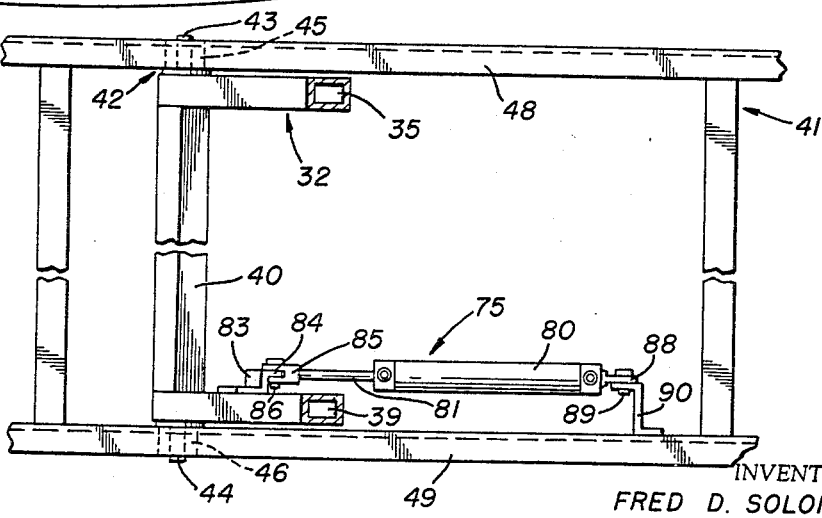
FIG. 7 is a cross section taken substantially on line 7—7 of FIG. 6.

Specifically, a second double acting control piston 79 (FIG. 9) is reciprocally slidable within an operating cylinder 80. A piston rod 81 is connected, at one end, to the piston 79 and extends outwardly through the end wall 82 of cylinder 80. The outer end of the piston rod 81 is pivotally attached to the positioning gate 32. As best seen in FIGS. 6 and 7, a Z-bar anchor 83 is fixed to the lower arm 39 of gate 32 and presents a connecting tab 84 embraced by a clevis 85 on the outermost end of piston rod 81. A pin 86 pivotally joins the clevis 85 to connecting tab 84.

The cylinder 80 is pivotally mounted from the frame 41. Specifically, a lug 88 on cylinder 80 is joined, by pin 89, to a Z-bar anchor 90 fixed to the lower bar 49 of frame 41.

As is also shown in FIG. 9, a lateral conduit 91 taps into the input conduit 76, as by T-connection 92, and communicates the pressure therein to the high pressure chamber 93 in cylinder 80—the high pressure chamber here too being the chamber exposed to that face 94 of piston 79 to which the piston rod 81 is attached.

The opposite face 95 of piston 79 exposed to the low pressure chamber 96 in cylinder 80. Chamber 96 communicates with the low pressure side of motor 30 by a lateral conduit 98 that taps into the return conduit 78 by a T-connection 99.

While the pump 51 is operating, fluid is pumped outwardly by conduits 52 and 76, through the respective motors 26 and 30 and returns via conduits 53 and 78. Under the "no load" condition—i.e., when the motors 26 and 30 are turning their respective brushes 11 and 12 against no external resistance—there is relatively little pressure drop across the motors 26 and 30. By proper selection of the relative working areas of the opposed working faces of the double acting pistons 54 and 79, under the "no load" condition the effective force on face 71 of piston 54 will exceed the effective force on face 70 and the effective force on face 95 of piston 79 will exceed the effective force on face 94. Under this condition the piston rods 56 and 81 will both be protracted.

Figure 1:
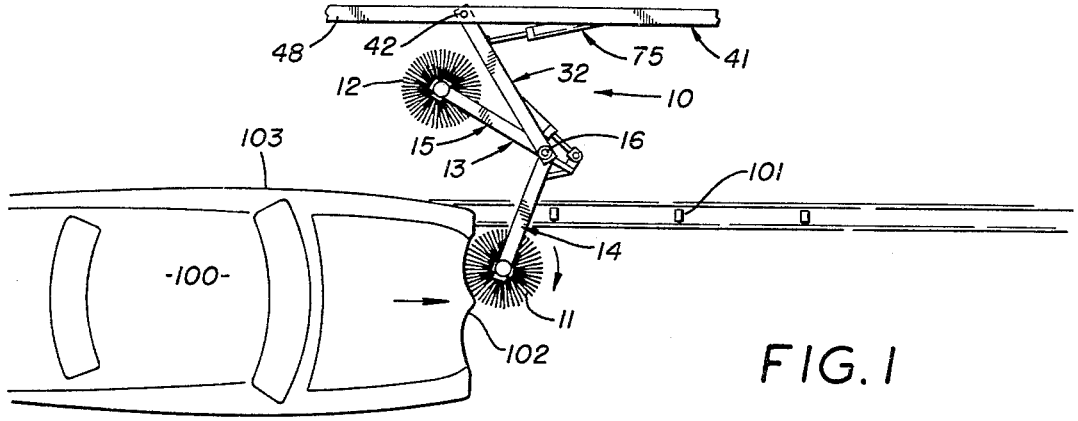
FIG. 1 is a schematic top plan of a mechanism embodying the concept of the present invention for supporting and positioning the brushes in a wraparound unit for cleaning at least a portion of the front and rear of a vehicle as well as one side thereof, the wraparound brush unit being depicted at the moment the vehicle to be washed makes contact therewith.

Fully protracted, the rods 56 and 81 maintain the support member 13 and positioning gate 32 rotated to their most clockwise position as viewed in top plan—rotated to substantially that position depicted in FIG. 1. So oriented, the first brush 11 is directly within the path of the vehicle 100 about to be washed, and the second brush 12 is laterally displaced therefrom.

As the vehicle is propelled along its path by the tire engaging conveyor 101, the front 102 of vehicle 100 is brought into contact with the first brush 11. As the front 102 is moved against the brush 11 the frictional contact therebetween increases the load on the motor 26 and a concomitant increase in the pressure differential across the motor results. This pressure differential is immediately reflected by the forces applied to the opposed working faces 70 and 71 of piston 54, and, when the pressure differential increases to a point determined by the ratio of their respective areas, the force on face 70 will exceed the force on face 71 and the piston 54 will move to retract rod 56.

Because the brush 12 is located laterally of the vehicle 100 during this initial contact with the front 102 thereof by brush 11, the pressure differential across motor 30 remains in the no load condition and rod 81 remains protracted holding the positioning gate 32 in its most clockwise position, even though the increasing frictional resistance against brush 11 is causing the rod 56 to retract.

The retraction of rod 56 tends to rotate the supporting member 13 so as to withdraw the brush 11 from contact with the vehicle 100. However, as soon as the support member 13 rotates sufficiently to lessen the frictional resistance against brush 11, the pressure differential across motor 26 and the corresponding forces on the opposed faces of piston 54 will be reduced. The brush 11 will, therefore, be continuously moved incrementally toward and away from the vehicle in response to the frictional contact therebetween. This "bracketing" movement, by the controlled rotation of the support member 13, results in the application of substantially uniform washing pressure against the vehicle 100 by brush 11. This arcuate movement of the support member 13 further accommodates the longitudinal movement of the vehicle as it is moved along the conveyor 100 and provides the lateral movement necessary to wash across the front 102 thereof.

Figure 2:
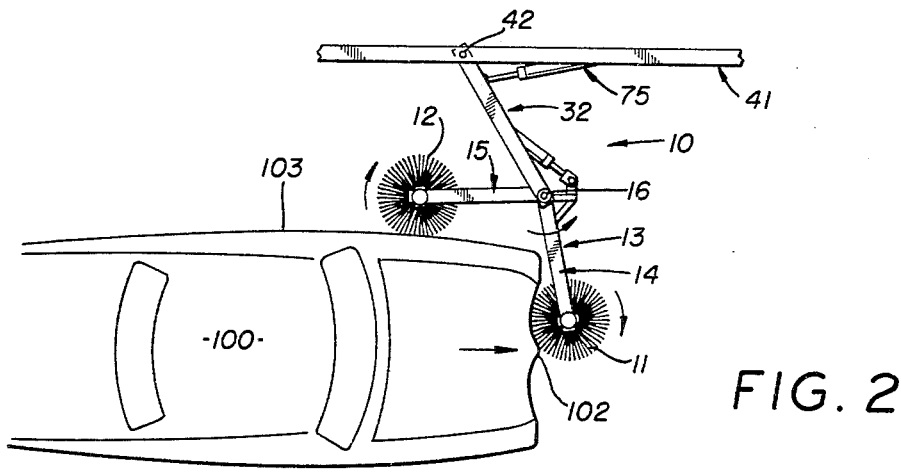
FIG. 2 is a schematic top plan similar to FIG. 1 depicting the mechanism shortly after the vehicle makes contact therewith, the first brush of said unit scrubbing the front of the vehicle and the second brush scrubbing the side thereof.

This same rotation of the support member 13 will eventually force the second brush 12 into contact with the side 103 of the vehicle 100 (FIG. 2). As the frictional contact of the second brush 12 against the side 103 of vehicle 100 increases, the load on motor 30 increases, as does the concomitant pressure differential thereacross.

Figure 3:
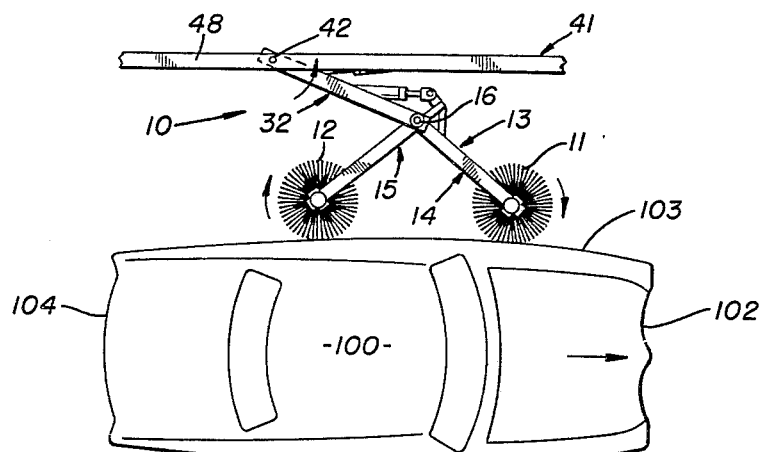
FIG. 3 is a schematic top plan similar to, and sequentially after, FIGS. 1 and 2 depicting the mechanism supporting and positioning both brushes in scrubbing relation with the side of the vehicle.

This increased pressure differential is immediately reflected by the forces applied to the opposed working faces 94 and 95 of piston 79 and the piston 79 will move to retract rod 81. Retraction of rod 81 causes the positioning gate 32 to rotate (clockwise as indicated by the arrow in FIG. 2) so as to withdraw the support member 13 about that arc defined by the pivotal connection of gate 32 to frame 41. As soon as this withdrawal of support member 13, and both brushes thereon, is begun, the load on both motors 26 and 30 is correspondingly reduced and the actuating means 50 and 75 adjust the relative positions of the support member 13 and the gate 32 so that the brushes 11 and 12 will continue to traverse the contours of the vehicle from the FIG. 2 position, around the corner of the vehicle, to the FIG. 3 position—all the time maintaining a substantially uniform scrubbing pressure against the vehicle.

Figure 4:
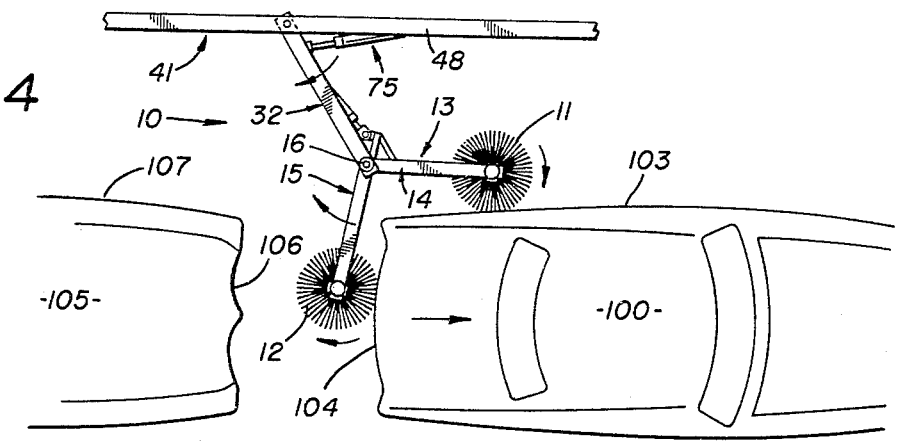
FIG. 4 is a schematic top plan similar to, and sequentially after, FIGS. 1–3 depicting the first brush still positioned to scrub the side of the vehicle and the second brush positioned to scrub the rear thereof.

Immediately after the brush 12 reaches the rearmost end of side 103 the frictional resistance thereagainst is reduced and the resulting pressure differential across motor 30 causes movement of piston 79 in actuating means 75 such as to protract rod 81. The resulting clockwise swing on gate 32 increases the load on brush 11 such that the actuating means 50 simultaneously rotates the support member 13 counterclockwise to maintain the constant pressure contact of brush 11 against the vehicle. As a result of this compound motion the brush 12 moves from the side 103 of the vehicle smoothly around the rear corner thereof and onto the back 104, as shown in FIG. 4.

The unique configuration of the mechanism for supporting and positioning the wraparound brushes, together with an actuating means having the sensitivity of that disclosed herein, assures that the two brushes will continuously apply a constant scrubbing pressure against a vehicle, irrespective of its contour. Moreover, such a mechanism is not dependent upon the rotational direction of the brushes so that they may be rotated in the most favorable scrubbing direction—as shown by the arrows in FIGS. 1–4, the preferred direction is generally that contra the direction that the scrubbed surface is moving with respect to each brush.

When the vehicle 100 moves beyond the range of the wraparound brushes so that no frictional resistance is offered thereagainst, the motors 26 and 30 return to their no load condition and the actuating means 50 and 75 automatically return the brushes 11 and 12 to the "ready" position depicted substantially in FIG. 1 by protraction of the piston rods 56 and 81.

Figure 5:
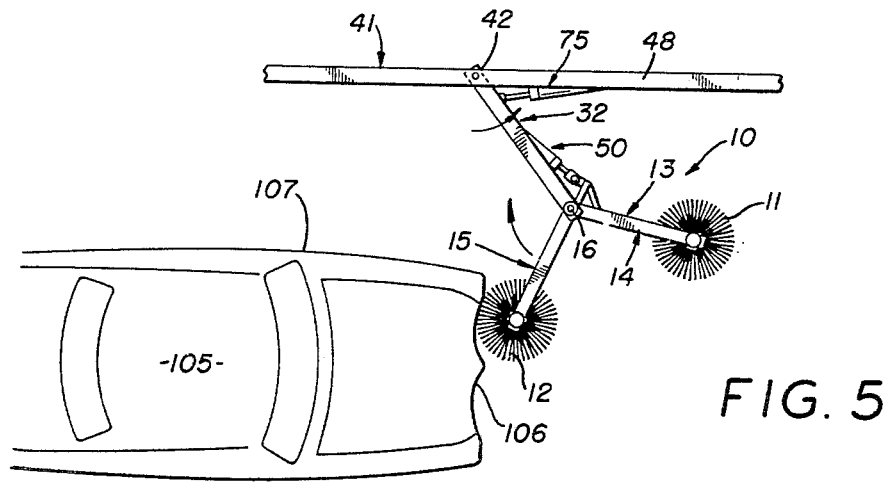
FIG. 5 is a schematic top plan similar to FIGS. 1–4 depicting the situation where the second brush is engaged by the front of the second vehicle before the unit has an opportunity to return to the ready position of FIG. 1 after completing its washing operation on the first vehicle.

If, however, due to carelessness on the part of the attendant or the driver of the next vehicle 105 to be washed, the space between vehicles 100 and 105 is too small to permit the mechanism 10 to return the brushes 11 and 12 to the ready position before the front 106 of vehicle 105 contacts the brush 12, as shown in FIG. 5, the subject mechanism 10 will readily accommodate vehicle 105. In prior art constructions engagement of the front of the successive vehicle 105 with that brush designated to scrub the rear of the preceding vehicle 100 would result in untold damage to the vehicle, the washing mechanism or both.

In the situation where the successive vehicle 105 too closely crowds the preceding vehicle 100 for the mechanism 10 to return to the "ready" position, the mechanism accommodates as follows. With no resistance applied against brush 11, as shown in FIG. 5, the actuating means 50 will cause the support member 13 to rotate in a clockwise direction about the pivotal axis 37. This, of course, forces the brush 12 firmly into engagement with the front 106 of the successive vehicle 105 and increases the load on motor 30. The actuating means 75 responds by rotating the gate 32 counterclockwise, as depicted by the arrow in FIG. 5. This counterclockwise rotation of gate 32 tends to move the entire support member 13 forwardly and away from the vehicle 105— but only at a rate controlled by the desired constant scrubbing pressure of brush 12 thereagainst. Thus, clockwise rotation of the support member 13 combines with counterclockwise rotation of gate 32 to produce a compound motion that results in a controlled movement of the brush 12 such that it scrubs evenly across the front 106 and onto the side 107 of vehicle 105.

The clockwise rotation of the support member 13 will also eventually bring brush 11 into contact with the vehicle 105 and the actuating mechanism 50 will then cooperate with actuating mechanism 75 to maintain both brushes 11 and 12 in uniform contact with the vehicle 105, as heretofore described in conjunction with vehicle 100.

Accordingly, a mechanism embodying the concept of the present invention for supporting and positioning the brushes of a wraparound unit may be operated solely by contact of the scrubbing brushes with the vehicle being washed, does not require any switches or valves, will not be jammed by premature contact with a vehicle and otherwise accomplishes the objects of the invention.

I claim:

1. A mechanism for supporting and positioning first and second brushes in a unit for a vehicular wash comprising, a single support means on which the first and second brushes are mounted in spaced relation, gate means for movably carrying said support means, first actuating means for selectively moving said support means with respect to said gate means in response to the frictional resistance met by the first brush, and second actuating means for selectively moving said gate means in response to the frictional resistance met by the second brush.

2. A mechanism, as set forth in claim 1, in which the first of the two brushes is disposed to wash at least a portion of the front and one side of a vehicle and the second of the two brushes is disposed to wash at least a portion of one side and the rear of a vehicle.

3. A mechanism, as set forth in claim 1, in which the first and second brushes are vertically disposed on said support means and said support means is pivotally secured to said gate means to translate the first and second brushes arcuately about the pivotal connection of said support means to said gate means.

4. A mechanism, as set forth in claim 3, in which the gate means is pivotally mounted to a frame to translate the first and second brushes on secondary arcs about the pivotal connection of said gate means to said frame.

5. A mechanism for supporting and positioning wraparound brushes in a vehicular wash comprising, a frame, a gate means movably supported on said frame, a support means movably mounted on said gate means, first and second washing brushes carried on said support means, first actuating means connected between said gate means and said support means, said first actuating means adapted to move said support means with respect to said gate means in response to the frictional resistance met by said first brush means, second actuating means connected between said frame and said gate means, said second actuating means adapted to move said gate means with respect to said frame in response to the frictional resistance met by said second brush means.

6. A mechanism, as set forth in claim 5, in which the two brushes are vertically oriented in spaced relation on said support means and said support means is pivotally connected to said gate means for horizontal arcuate movement.

7. A mechanism, as set forth in claim 6, in which said support means is bifurcated with two tine portions extending divergently outwardly from the pivotal connection of said support means to said gate means, one brush supported on each tine portion outwardly of said pivotal connection.

8. A mechanism, as set forth in claim 7, in which said gate means is, in turn, pivotally connected to a frame for horizontal arcuate movement.

9. A mechanism, as set forth in claim 5, in which the support means is pivotally mounted on said gate means, said first actuating means swinging said support means with respect to said gate means to translate said brushes arcuately about the pivotal connection of said support means to said gate means in response to the frictional resistance between the vehicle being washed and said first brush, and in which the gate means is pivotally mounted on said frame, said second actuating means swinging said gate means with respect to said frame to translate said brushes on secondary arcs about the pivotal connection of said gate means to said frame in response to the frictional resistance between the vehicle being washed and said second brush.

References Cited

UNITED STATES PATENTS 3,090,981  5/1963  Vani et al.
3,310,824  3/1967  Beer.

OTHER REFERENCES

Auto Laundry News, October 1966, p. 33.

EDWARD L. ROBERTS, Primary Examiner